United States Patent [19]

Strohschein

[11] 4,098,140
[45] Jul. 4, 1978

[54] GEAR JOINT

[75] Inventor: Donald K. Strohschein, Naperville, Ill.

[73] Assignee: Caterpillar Tractor Co., Peoria, Ill.

[21] Appl. No.: 779,980

[22] Filed: Mar. 22, 1977

[51] Int. Cl.² .............. F16H 55/12; F16H 57/00; F16H 55/30

[52] U.S. Cl. .............. 74/447; 74/243 DR; 74/411

[58] Field of Search .......... 74/447, 446, 406, 411, 74/243 DR

[56] References Cited

U.S. PATENT DOCUMENTS

| | | | |
|---|---|---|---|
| 2,932,207 | 4/1960 | Whitney | 74/243 DR |
| 3,206,993 | 9/1965 | Nieman | 74/441 X |
| 3,381,548 | 5/1968 | Wolkenstein | 74/801 |

FOREIGN PATENT DOCUMENTS

| | | | |
|---|---|---|---|
| 2,339,882 | 2/1975 | Fed. Rep. of Germany | 74/441 |
| 2,438,331 | 2/1976 | Fed. Rep. of Germany | 74/446 |
| 862,881 | 3/1961 | United Kingdom | 74/447 |

*Primary Examiner*—Leonard H. Gerin
*Attorney, Agent, or Firm*—John L. James

[57] ABSTRACT

A joint is provided for a gear which has a hub and a peripheral toothed portion. The toothed portion is positioned about the hub for mating an associated gear and rotates in a preselected plane. The joint connects the hub and toothed portion of the gear and absorbs motion.

6 Claims, 1 Drawing Figure

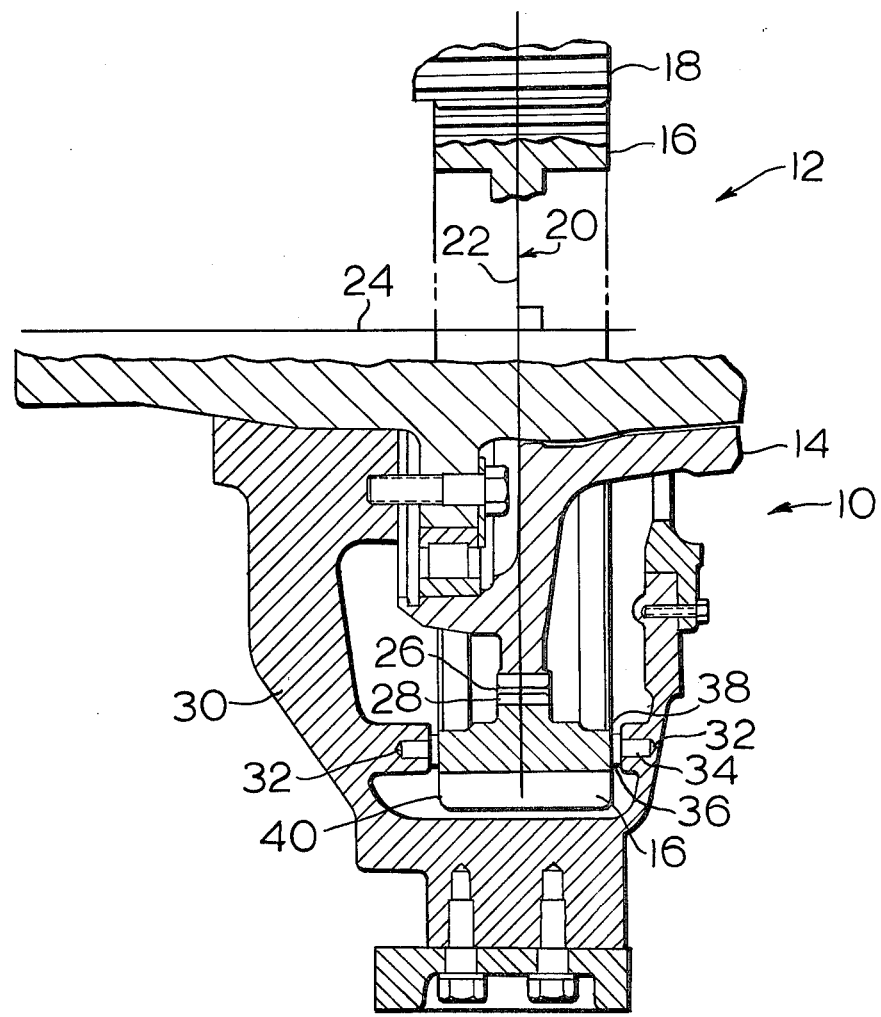

GEAR JOINT

BACKGROUND OF THE INVENTION

A gear which has teeth designed to engage with teeth of an associated gear sometimes overloads these teeth. Overloading is a problem where the driving gear has a hub which can be moved or deflected to load the teeth unevenly. Overloading is a problem where only a few of the teeth engage at any one time, as in a final drive of a track-type tractor, for example, where only a few of the teeth on the final drive gear engage teeth on the associated gear and must carry all of the load.

The present invention is directed to overcoming one or more of the problems as set forth above.

According to the present invention, a joint is provided for a gear which has a hub and a peripheral toothed portion positioned about the hub for mating with an associated gear and rotating in a preselected plane. The joint connects the hub and toothed portion of the gear and has a construction sufficient for absorbing motion of the hub relative to the toothed portion.

BRIEF DESCRIPTION OF THE DRAWING

The drawing is a partial cross-sectional view of a final drive gear.

DETAILED DESCRIPTION OF THE INVENTION

Referring to the drawing, a gear, such as a final drive gear 16 of a track-type tractor 12, for example, has a hub 14 and a peripheral toothed portion 16 positioned for mating with an associated gear 18 and rotating in a preselected plane 20. The preselected plane 20 is formed by rotating a line 22 which is substantially perpendicular to an axis 24 of the hub 14 about the axis 24. Any motion of the hub 14 which shifts the axis 24 and forms a plane not parallel to the preselected plane 20 is herein considered deflective motion. A joint 26 connects the hub 14 and toothed portion 16 which preferably contain mateable splines 28 for making the joint 26 a splined joint. The splines 28 have a construction sufficient for interlocking engagement in response to motion in the preselected plane 20 and for relative movable engagement in response to deflective motion.

The construction of the splines 28 for providing sufficient relative motion and deflective motion absorption is dependent upon the magnitude of the expected deflection forces. One skilled in the art can readily calculate the desirable spline tolerance once the magnitude of the expected deflection forces have been determined.

A housing 30 partially encloses the final drive gear 10 and there are a number of motion limiters 32 which are preferably attached to the housing 30 and preferably adjustable but can be attached to the toothed portion 16. Each motion limiter 32 has a base portion 34 and a contacting surface 36 which is preferably a bearing surface. The base 34 mounts on the housing 30 and the surface 36 is positioned in a preselected spaced relation to the hub 14, toothed portion 16, or both. The motion limiters 32 are positioned on one side 38 of the toothed portion 16, the other side 40 of the toothed portion 16, or preferably on both sides of the toothed portion 16.

In the operation of the final drive sprocket gear 10, the hub 14 moves relative to the toothed portion 16 in response to deflective motion. The joint 26 can be made to absorb substantially all of the deflective motion. The motion limiters 32 limit the movements of the toothed portion 16 to motion substantially in the preselected plane 20. Thus, deflective motion is substantially restricted to the final drive gear 10 and is not transmitted to the associated gear 18. The motion limiters 32 are preferably used with the joint 26 but either the joint 26 or motion limiters 32 can be used alone.

The embodiments of the invention in which an exclusive property or privilege is claimed are defined as follows:

1. In a gear having a hub and a peripheral toothed portion positioned about said hub for mating with an associated gear and rotating in a preselected plane, the improvement comprising:
   a joint connecting said hub and toothed portion and being of a construction sufficient for absorbing deflective motion of the hub relative to the toothed portion, said deflective motion being in a direction different than along said preselected plane; and
   at least two motion limiters each having a base and a contacting surface and being disposed in a preselected spaced relation to one of said hub and toothed portion and disposed in spaced relation therefrom.

2. An apparatus, as set forth in claim 1, wherein said joint is a splined joint.

3. An apparatus, as set forth in claim 1, wherein said hub and toothed portion each contain a plurality of splines, said splines having a size and configuration sufficient for interlocking engagement in said preselected direction and for movable engagement in other directions.

4. An apparatus, as set forth in claim 1, wherein said surface is a bearing surface.

5. An apparatus, as set forth in claim 1, including a housing, said base of said motion limiter being mounted on said housing.

6. In a gear having a hub and a peripheral toothed portion positioned about said hub for mating with an associated gear and rotating in a preselected plane, the improvement comprising:
   a joint connecting said hub and toothed portion and being of a construction sufficient for absorbing deflective motion of the hub relative to the toothed portion, said deflective motion being in a direction different than along said preselected plane; and
   a plurality of motion limiters each having a base and a contacting surface on said base, said surface being positioned in a preselected spaced relation to said toothed portion and disposed on one of a first side of the toothed portion, a second opposed side of the toothed portion, and both sides of the toothed portion.

* * * * *